United States Patent
Willett et al.

(10) Patent No.: US 11,972,753 B2
(45) Date of Patent: *Apr. 30, 2024

(54) SYSTEM AND METHOD FOR PERFORMING AUTOMATIC SPEECH RECOGNITION SYSTEM PARAMETER ADJUSTMENT VIA MACHINE LEARNING

(71) Applicant: Nuance Communications, Inc., Burlington, MA (US)

(72) Inventors: Daniel Willett, Aachen (DE); Yang Sun, Aachen (DE); Paul Joseph Vozila, Arlington, MA (US); Puming Zhan, Acton, MA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,880

(22) Filed: Oct. 20, 2020

(65) Prior Publication Data

US 2021/0035560 A1 Feb. 4, 2021

Related U.S. Application Data

(63) Continuation of application No. 16/051,044, filed on Jul. 31, 2018, now Pat. No. 10,810,996.

(51) Int. Cl.
*G10L 15/06* (2013.01)
*G06F 16/68* (2019.01)
(Continued)

(52) U.S. Cl.
CPC .......... *G10L 15/063* (2013.01); *G06F 16/68* (2019.01); *G06N 20/00* (2019.01); *G10L 15/16* (2013.01); *G10L 15/26* (2013.01); *G10L 25/03* (2013.01)

(58) Field of Classification Search
CPC ....... G10L 15/063; G10L 15/16; G10L 15/06; G10L 15/22; G10L 15/26; G10L 15/20; G10L 15/08; G10L 15/32; G10L 25/03; G10L 25/30; G10L 13/08; G06F 16/68; G06N 20/00; G06N 20/10; G06N 3/0445; G06N 3/0454; G06N 3/04; G06N 3/082; G06N 3/08; G06N 5/003; G06N 5/00
USPC ....... 704/231, 232, 233, 234, 239, 241, 243, 704/244, 245, 246, 247, 248, 249, 250, 704/255, 256.2, 256.3, 257; 706/53, 12, 706/20, 25, 934
See application file for complete search history.

(56) References Cited

U.S. PATENT DOCUMENTS

2008/0010057 A1 * 1/2008 Chengalvarayan ... G10L 15/065
704/9
2008/0147402 A1 6/2008 Jeon
(Continued)

*Primary Examiner* — Leshui Zhang
(74) *Attorney, Agent, or Firm* — Barta Jones, PLLC

(57) ABSTRACT

A system, method and computer-readable storage device provides an improved speech processing approach in which hyper parameters used for speech recognition are modified dynamically or in batch mode rather than fixed statically. The method includes estimating, via a model trained on audio data and/or metadata, a set of parameters useful for performing automatic speech recognition, receiving speech at an automatic speech recognition system, applying, by the automatic speech recognition system, the set of parameters to processing the speech to yield text and outputting the text from the automatic speech recognition system.

20 Claims, 8 Drawing Sheets

(51) Int. Cl.
  *G06N 20/00*  (2019.01)
  *G10L 15/16*  (2006.01)
  *G10L 15/20*  (2006.01)
  *G10L 15/26*  (2006.01)
  *G10L 15/32*  (2013.01)
  *G10L 25/03*  (2013.01)

(56)  References Cited

U.S. PATENT DOCUMENTS

| | | |
|---|---|---|
| 2009/0018833 A1 | 1/2009 | Kozat |
| 2009/0306977 A1 | 12/2009 | Takiguchi |
| 2013/0268270 A1* | 10/2013 | Jiang .................. G10L 15/07 |
| | | 704/236 |
| 2014/0316762 A1 | 10/2014 | Ehsani |
| 2014/0324434 A1* | 10/2014 | Vozila .................. G10L 15/063 |
| | | 704/257 |
| 2015/0081288 A1 | 3/2015 | Kim |
| 2016/0253989 A1 | 9/2016 | Kuo |
| 2016/0284349 A1* | 9/2016 | Ravindran .............. G10L 15/20 |
| 2016/0293161 A1 | 10/2016 | Bocchieri |
| 2016/0307565 A1* | 10/2016 | Liu ........................ G10L 15/16 |
| 2017/0018270 A1 | 1/2017 | Min |
| 2017/0040016 A1* | 2/2017 | Cui ........................ G10L 15/16 |
| 2018/0061398 A1 | 3/2018 | Gomez |

* cited by examiner

SYSTEM AND METHOD FOR PERFORMING AUTOMATIC SPEECH RECOGNITION SYSTEM PARAMETER ADJUSTMENT VIA MACHINE LEARNING

PRIORITY INFORMATION

The present application is a continuation of U.S. patent application Ser. No. 16/051,044, filed Jul. 31, 2018, the content of which is incorporated herein by reference in its entirety.

BACKGROUND

1. Technical Field

The present disclosure relates to speech recognition and more specifically to implementing a model trained on audio data and/or metadata to estimate hyper parameter settings that are favorable to automatic speech recognition decoding for a specific condition, speaker, channel and/or environment.

2. Introduction

Automatic speech recognition systems need tuning of system parameters, which are often referred to as "magic" parameters or hyper parameters. The most prominent parameters in this category are word insertion penalty, language model scale and beam pruning width. A common practice is to tune these parameters on sample audio data, with a goal of good automatic speech recognition performance within a certain compute budget. The developer then uses the fixed settings in automatic speech recognition system installments.

The process of decoding received speech into text usually utilizes several models, such as an acoustic model and language model to generate final speech recognition results. The acoustic model is a statistical model or neural network model that is trained on audio to determine a likelihood that certain phonemes are found within the audio signal. The language model is trained on how phonemes are pieced together to make words, and how likely certain words will follow each other within the audio signal. The automatic speech recognition decoding process must evaluate results from these two different models to arrive at the final text output. The decoder looks for the most likely word sequence. Additionally, a duration model can also be used, which can complicate the process. Hyper parameters have been implemented to combine the outputs from these various models in the automatic speech recognition decoding process.

DESCRIPTION

Figure 1:
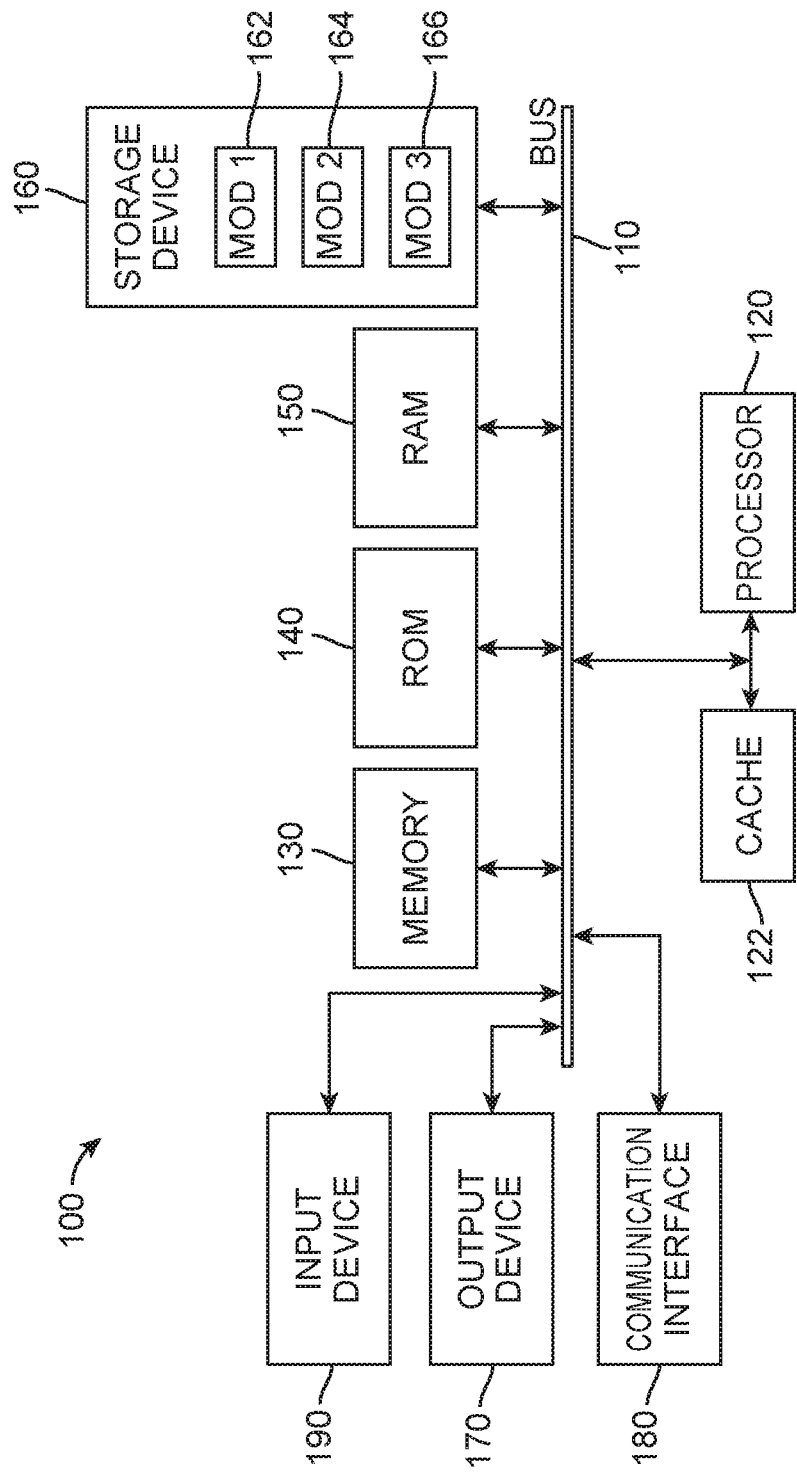
FIG. 1 illustrates an example system embodiment.

The hyper parameters described above that are implemented by a speech recognition system. The hyper parameters are configured with various weights and associated with how to piece together the output from various different models in the automatic speech recognition decoding process. Typically, these hyper parameters are fixed when an automatic speech recognition system is developed and deployed. Often, the developer of the speech recognition system will test the system by tuning these parameters and then fix them when the system is placed in use. Some parameters might include the degree of approximation that the system will use when making speech recognition decisions. In another example, the parameters might relate to how to prune a beam width when the system searches through the model for potential matches relative to the input audio. For example, searching through the entire model space might be very computationally expensive and by pruning a beam width, the system can focus the search on a narrower or smaller amount of the search space, thus improving efficiencies and the responsiveness of the system.

Determining what the output parameters are from a model estimator requires training on target data, which can be a difficult process. The system may utilize training or target data which can be applied for estimating hyper parameters. For example, the model can be trained to identify optimal or preferable sets of hyper parameters for different acoustic environments such as environments for certain vehicles, environments for outdoors, street corners, office environments, home environments, environments with radio or television background, users, sets of users, and so forth. The fixed hyper parameters in automatic speech recognition systems will not take these variations into account as they are primarily focused on harmonizing or utilizing the data from the acoustic model, the language model and other models, for ultimately performing speech recognition. The machine learning model disclosed herein can be trained utilizing various sets of target data. The model can receive audio and/or separate metadata in order to directly output estimated hyper parameters or identified buckets of predetermined hyper parameter configurations for use in automatic speech recognition decoding.

The present disclosure provides an improvement to the common practice of utilizing fixed settings for important or relative parameters in automatic speech recognition system installments. The fixed settings of parameters represent a tuned operating point that is usually a compromise because good settings are known to vary substantially across acoustic conditions and application domains. Even for a same test set and application, differences across acoustic conditions and application domains can still exist due to such factors as signal-to-noise ratio, type of background noise, the speaking rate of a user, speaker or channel characteristics, linguistic or utterance content, and other factors which may not be fully understood. The use of a single fixed set of system parameters as a compromise across many conditions can be a limiting factor in recognition performance. This is the problem addressed by the present disclosure. The proposal disclosed herein is to utilize a dynamic and adaptive approach to setting one or more parameters for automatic speech recognition systems. This disclosure provides various approaches on how to make such improvements. The goal of the present disclosure is to improve automatic speech recognition accuracy, especially for outlier conditions, speakers and channels.

It is noted that while the primary examples disclosed herein will focus on specific and typical automatic speech recognition tuning parameters, the present disclosure covers other parameters as well, such as parameters that future automatic speech recognition techniques might develop. Accordingly, a reference to parameters as discussed herein is not intended to be limited to specific parameters that are identified, such as word insertion penalties, beam pruning width, and so forth. The present disclosure could apply to newly introduced parameters in connection with improved speech processing technologies. In other words, if a new parameter X were introduced as important or useful in processing speech, then the present disclosure can include or encompass the concept of dynamically tuning, or tuning in batch mode, parameter X for speech processing.

This disclosure also notes that the principles disclosed herein can apply to other speech processing applications beyond automatic speech recognition. For example, parameters can be tuned dynamically or in batch mode for natural language understanding, text-to-speech processes, or any other speech related process. Furthermore, the principles can also be expanded to encompass non-speech processes in which parameters are applied in the context of processing data input in order to yield output data. For example, video or image data could be processed to identify individual faces, or characteristics of the data utilizing parameters that could be adjusted dynamically or in batch mode as disclosed herein. The present disclosure can apply to any context of data processing.

BRIEF INTRODUCTION

Methods and systems are disclosed for addressing the technical problem with utilizing fixed settings in automatic speech recognition installments. An example method includes estimating, via a model trained on audio data and/or metadata, a set of parameters useful for performing automatic speech recognition, receiving speech at an automatic speech recognition system, applying, by the automatic speech recognition system, the set of parameters to processing the speech to yield text and outputting the text from the automatic speech recognition system. The parameters in the set of parameters can include hyper or "magic" parameters that have relatively significant value in terms of speech processing accuracy. Example parameters for use in the set of parameters can include one or more of a word insertion penalty, a language model scale, an acoustic model scale, a silence prior penalty, a word penalty, and a beam pruning width.

Applying the set of parameters to processing the speech to yield text can be performed dynamically during automatic speech recognition by the automatic speech recognition system or can be performed in a batch mode after a first decoding process on the speech by the automatic speech recognition system without a modified set of parameters.

The present disclosure also discusses various ways of training, a machine learning model to estimate the set of parameters as disclosed herein.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1, which can be employed to practice the concepts, methods, and techniques disclosed, is illustrated. A more detailed description of specific embodiments will then follow. These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2A:
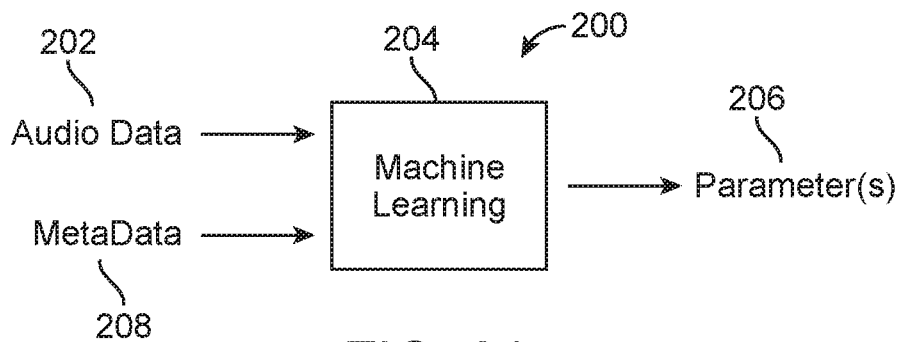
FIG. 2A illustrates an example machine learning model, receives audio as input and generates output used to manage parameters.

Having disclosed some components of a computing system, the disclosure turns to FIG. 2A, which illustrates the basic components 200 of the model described herein. The present disclosure focuses on an aspect of the estimation of model parameters on data which lies in a data-based adjustment of system parameters, such as parameters that determine relative weights of involved models as well as those that control the decoding of data, such as speech, to fit into computational constraints to arrive at a best possible speech recognition accuracy or at a preferred threshold of speech recognition accuracy. The parameters are usually considered intractable to model-based learning, and need to be tested or set via grid search on development data. Cross validation is a method for robustly estimating test set performance or generalization of the model. The concept of grid-search is a way to select the best family of models parameterized by a grid of parameters. Again, the present disclosure introduces a novel approach to adjust such system parameters dynamically, or in batch mode.

As shown in FIG. 2A, input data 202 is provided to a machine learning model 204 which is trained on data to estimate the advantageous parameters that are favorable to decoding. These parameters have been called magic parameters or hyper parameters. In one aspect, a hyper parameter is a parameter whose value is set before the learning process begins. Other parameter values can be derived via training. The parameters can relate to weights or values associated with speech recognition and can relate to how to balance the output from two or more models (acoustic, language, etc.) used in speech recognition.

The output 206 is shown generally as parameter1 and parameter2, which can represent a number of different kinds of data. For example, the model output 206 can control the hyper parameters dynamically during decoding or during speech processing, or the model output 206 can be used to adjust the hyper parameters in batch mode application after a first decoding pass and can also be used in following decoding passes or in rescoring attempts. For example, a rescoring attempt can rescore result options from a first speech recognition pass given the estimated hyper parameters.

The concepts introduced above suggest that only audio is input to a hyper parameter estimator. However, in another aspect of this disclosure, the audio input to the hyper parameter estimator can be augmented with other data 208 that can be also evaluated by the estimator to generate the updated parameters. The additional data 208 can be metadata drawn from any source. For example, metadata might include a name, age, gender, culture, ethnicity, social media data, height, weight, personal preferences, historical purchasing data, and so forth about the speaker. The metadata might include location data, data about current events, data about the characteristics of the environment of the speaker, and so forth.

The machine learning or hyper parameter estimator 204 can receive the audio data 202, or metadata 208 or both. The data may also include information extracted from one or more previous utterances. The data can include information regarding an input device or an application context associated with the audio that is received. For example, the user might be in a certain phase of an on-line game. The information extracted from previous utterances can be extracted audio, channel information, speaker information or speaker features, automatic speech recognition results, or data characterizing those results. The data can include any one or more of these data points discussed above or any combination thereof.

The hyper parameter estimator 204 can be trained to adjust its output based on this non-audio input data. For example, the estimator can be trained on appropriate parameters for individuals from a particular culture, or from a particular location, or for a particular age. The estimator can be trained to output parameter adjustments based on the input device or based on the particular application context. The data might also relate to other aspects of the speech, such as volume or cadence or whether an emotion is detected within the speech, such as anger or frustration. Information extracted from previous utterances can include data about an elevating level of volume and a quickening of the cadence of the speech, which can indicate the user is growing angry. This non-audio data 208 (or metadata about the audio characteristics) can be fed from any source, and can include data associated with the automatic speech recognition results of previous utterances in the system.

Figure 2B:
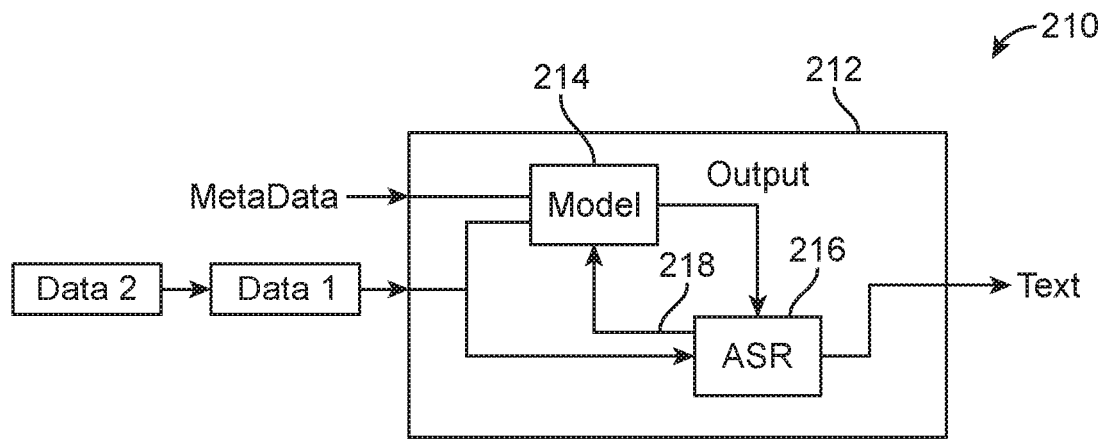
FIG. 2B illustrates an example speech recognition system utilizing the model disclosed herein to improve recognition accuracy.

FIG. 2B illustrates 210 a general system 212 for processing received speech according to the principles disclosed herein. Speech is received at the automatic speech recognition system 212. As this disclosure discusses in several places a windowing approach, the speech is shown as arriving at the system 212 as data 1 and then data 2. The speech or audio data is provided to a trained model 214, which generates output that can be utilized to control, modify, or replace parameters dynamically, or in batch mode, such that revised parameters are used by an automatic speech recognition engine 216 when decoding the speech. In batch mode, the estimating and/or applying of the parameters for processing the speech can occur with parameters estimated based on full utterances. The trained model can be termed a hyper parameter estimator 204 as well. The text that is output from the automatic speech recognition system 212 can thereby be improved over processing the speech via the automatic recognition system 216 utilizing the original hyper parameters.

FIG. 2B also shows metadata being received by the speech recognition system 212. The metadata is provided to the model 214. The system can receive the data 1, data 2 and/or the metadata.

As is noted herein, there are different approaches in which the estimated parameters output from the model 214 for the frame 1 of the speech can be used for the decoding of frame 1 by the decoder 216 in which the decoder has a built-in delay in order to apply the estimated parameters to the same frame. In another aspect, the output parameters for frame 1 are used to decode frame 2 by the automatic speech recognition decoder 216. This can be a continuous process in which the output parameters for a respective frame are applied to the decoding of the subsequent frame.

Estimating the set of parameters useful for performing automatic speech recognition can produce one or more of (1) the set of parameters directly as target layer outputs or (2) the set of parameters as a predefined parameter configuration chosen from a group of predefined parameter configurations. The model 214 can of course be a machine learning model, or some form of neural network. The model 214 can estimate the parameters directly using a regression model as well in which the model is trained using a regression target. Another aspect of the model 214 can include the use of a classification approach in which the system has various buckets of predefined hyper parameters and can determine the ideal pocket parameter configurations, such as a parameter configuration for an office environment with a particular speaker, or an outdoor environment for that speaker, or configuration for a particular device having a microphone feature that provides a certain channel characteristic. The user or the system can create these different buckets of parameters and the model 214 can be trained to output a most likely parameter configuration to use as the estimated parameters. In some cases, the estimated parameters may only be one, two or three parameters. Of course, more than three parameters is also contemplated. The buckets can be configured such as a first bucket having hyper parameter1 with a value of 5 and hyper parameter2 with a value of 7. The output of the model might be simply (5, 7) or simply 1 for bucket 1. In one aspect, the automatic speech recognition decoder could include the definitions of the various buckets in the parameters contained in each respective bucket such that if the model simply provides the number 1 as output, automatic speech recognition decoder could apply hyper parameters 5 and 7 associated with the definition of bucket 1. It is preferable, however, that the first scenario would be implemented in which the model 214 would provide the updated parameters to the automatic speech recognition decoder such that the decoder does not need to be reprogrammed with the list or the data regarding the various bucket configurations.

Whether a regression model is used or a bucket-based model is used can depend on whether the system is operating in an online, real-time scenario or an off-line scenario where dynamic or real-time responsiveness is not needed. The system could be configured to apply either scenario based on a number of factors as well. Different models could also be applied in the same system depending on the context (on-line, off-line, etc.). In this scenario, the system would switch modes as necessary or desirable.

The buckets can be defined for certain environments. For example, data associated with audio or acoustic characteristics for specific cars can be developed. The data can be applied to the hyper parameter estimators as metadata or as part of the training process. Utilizing such data can help to generate the estimated parameters or classify the audio in a certain way such that audio associated with a certain vehicle, such as a 2018 X-brand Truck, can be identified because the speaker is driving the truck. The system can access the appropriate parameters associated with that acoustic environment and ultimately apply those parameters to automatic speech recognition decoding for improved speech processing. There is no limit on utilizing such data or training parameters. For example, the knowledge about the acoustic environment for any vehicle can be utilized in terms of identifying target hyper parameters to be output from the estimator for use with automatic speech decoding.

It is noted that FIG. 2B represents a single processing system 212 that includes the model 214, as well as automatic speech recognition engine 216. This disclosure also contemplates that the model 214 may be separated from the automatic speech recognition system and may be operated independently of that system. For example, an online service could receive the speech and process the speech using the model 214 to generate the output data that can be used to control the parameters during decoding. Such an online service could provide over the Internet, or any other network, those parameters to a separate server, or automatic speech recognition system or a client system.

In another aspect, the system might generate estimated parameters geared towards a certain recognition context, such as a client speech recognition engine on a mobile device, a certain environment of the user (car, sidewalk, office, etc.) or a network-based speech recognition engine. Different parameters might be developed and output from the trained model depending on the recognition engine capacity.

The model 214 can also receive other data as shown in FIG. 2B. The concepts introduced above suggest that only audio is input to a hyper parameter estimator. However, in another aspect of this disclosure, the audio input to the hyper parameter estimator 214 can be augmented with other data that can be also evaluated by the estimator 214 to generate the updated parameters. The additional data can be metadata drawn from any source and cover or address any aspect of the audio. For example, metadata might include a name, age, gender, culture, ethnicity, social media data, height, weight, personal preferences, historical purchasing data, and so forth, about the speaker. The metadata might include location data, data about current events, data about the characteristics of the environment of the speaker, and so forth. The data may also include information extracted from one or more previous utterances. The data can include information regarding an input device or an application context associated with the audio that is received. For example, the user might be in a certain phase of an on-line game, which can generate or be associated or represented by metadata. The information extracted from previous utterances can be extracted audio, channel information, speaker information or speaker features, automatic speech recognition results, or data characterizing the results. The data can include any one or more of these data points discussed above or in any combination thereof. In one aspect, the estimator 214 can receive and process the metadata only, or both the metadata and the audio. The estimator 214 can be trained to process any combination of the input data.

The hyper parameter estimator 214 can be trained to adjust its output based on this non-audio input data. For example, the estimator can be trained on appropriate parameters for individuals from a particular culture, or from a particular location, or for a particular age. The estimator can be trained to output parameter adjustments based on the input device or based on the particular application context, such as the characteristic of a certain vehicle model. The data might also relate to other aspects of the speech, such as volume or cadence or whether an emotion is detected within the speech, such as anger or frustration. Information extracted from previous utterances can include data about an elevating level of volume and a quickening of the cadence of the speech which can indicate the user is growing angry. This non-audio data (or metadata about the audio characteristics) can be fed from any source, and can include data associated with the automatic speech recognition results of previous utterances in the system.

FIG. 2B also illustrates data 218 being fed from the automatic speech recognition component 216 back to the model 214. This can be data associated with confidence scores with respect to the quality of the speech recognition output, parameters drawn from the automatic speech recognition decoding process, or other feedback, which can be utilized by the estimator model 214 to process the received speech. In another aspect, the metadata could also be provided to the automatic speech recognizer 216 directly as well.

Figure 2C:
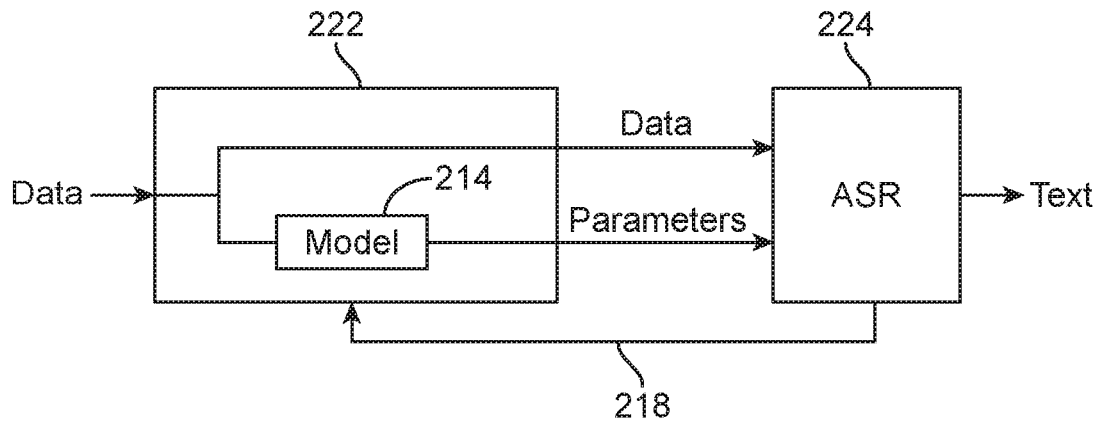
FIG. 2C illustrates another example speech recognition system.

FIG. 2C illustrates one example approach 220 in which a network-based component 222 can operate to receive speech/data over a network at the component 222. The component receives the speech and estimates hyper parameters that are favorable when decoding the speech. The output from the component 222 can include the speech in its original form, or to some degree in a modified form, as well as the output from the model. The speech and the output can then be transmitted over a network to an automatic speech recognition component 224 which can receive the speech and the output, update its magic or hyper or other parameters, and produce text according to the output. The text that is produced will be more accurate than would be generated without the estimated parameters. In another aspect, the component can be on the device and perform calculations locally. In another aspect, the speech may be provided directly to the ASR component 224, as well as directly to the hyper parameter estimator 214. The data shown in FIG. 2C may also represent the metadata as well which optionally can be provided to the component 222. The metadata can also be received at the model 214 and/or communicated by the component directly to the ASR component 224 to aid or provide further data about the speech for recognition purposes.

Figure 3:
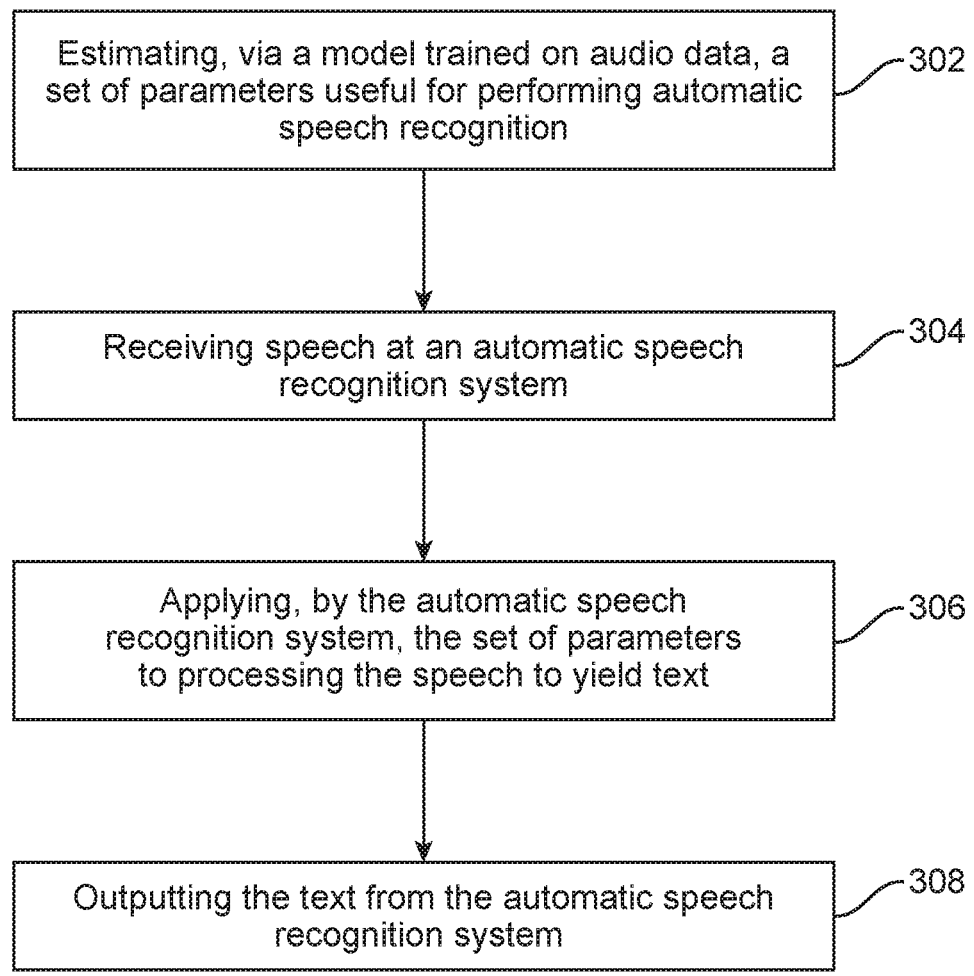
FIG. 3 illustrates an example embodiment for the control of parameters used in speech recognition.

FIG. 3 illustrates an example method of controlling the parameters during a decoding process. A method includes estimating, via a model trained on audio data and/or metadata, a set of parameters useful for performing automatic speech recognition (302), receiving speech at an automatic speech recognition system (304), applying, by the automatic speech recognition system, the set of parameters to process the speech to yield text (306), and outputting the text from the automatic speech recognition system (308). In one aspect, the parameters in the set of parameters can include hyper parameters and/or can be used to replace one or more previously fixed parameters in the system. The set of parameters can include one or more of a word insertion penalty, a language model scale, an acoustic model scale, a silence prior penalty, a silence prior, a word penalty, and a beam pruning width, a duration model scale, other search pruning control parameters, and language model interpolation weights. Any parameter now existing or introduced in future signal processing can be used to train the model for use in estimating a set of parameters for processing the speech. In one aspect, the method can be dynamic and occur continuously while receiving and processing speech, and in another aspect, the method can be performed in batch mode. Hybrid aspects are also contemplated where parameters are partially estimated for updating at the decoder and partially remain fixed.

The model trained on audio data can utilize one or more of a signal-to-noise ratio estimate, reverberation time, a mel-frequency cepstral coefficient, and an audio signal, to estimate the set of parameters. Any other feature that can be extracted from audio data can also be utilized by the model in a machine learning context to estimate the set of parameters. Further, non-speech metadata can also be received and processed by the model in order to further refine and generate estimated hyper parameters. Where metadata is used, the model can be trained using example metadata.

The characteristics of the model can also vary. For example, the model can be one of a feedforward neural network, unidirectional or bidirectional recurrent neural network, a convolutional neural network, or a support vector machine model.

Applying the set of parameters at a decoder for processing the speech to yield text is performed, in one aspect, dynamically during automatic speech recognition. In this regard, it is noted that the model estimates the hyper parameters that are favorable for decoding in a same pass as when the system is utilized to process speech input.

This approach works well in a low latency online speech recognition scenario. In this context, audio or audio features are extracted continuously from the data input and fed continuously into the model 204 that also continuously estimates the set of parameters. In this scenario, short-term, window-based audio features such as filter-bank energies or mel-frequency cepstral coefficients are suggested. In one aspect, unidirectional recurrent neural networks (RNN), or long short-term memory (LSTM) units, appear particularly suited for allowing for a dynamic adjustment during automatic speech recognition decoding with negligible latency impact. A model can be trained on audio data that utilizes one or more of a signal-to-noise ratio estimate, reverberation time estimate, a short-term window frequency analysis, a mel-scale frequency cepstral analysis, time-domain signal audio signal directly, and/or metadata to estimate the set of parameters. Metadata features can include, among others, an applicationId, a speakerId, a deviceId, a channelId, a date/time, a geographic location, an application context, and a dialogue state. Metadata can get represented as one-hot vector or via means of embedding as model input.

Figure 4:
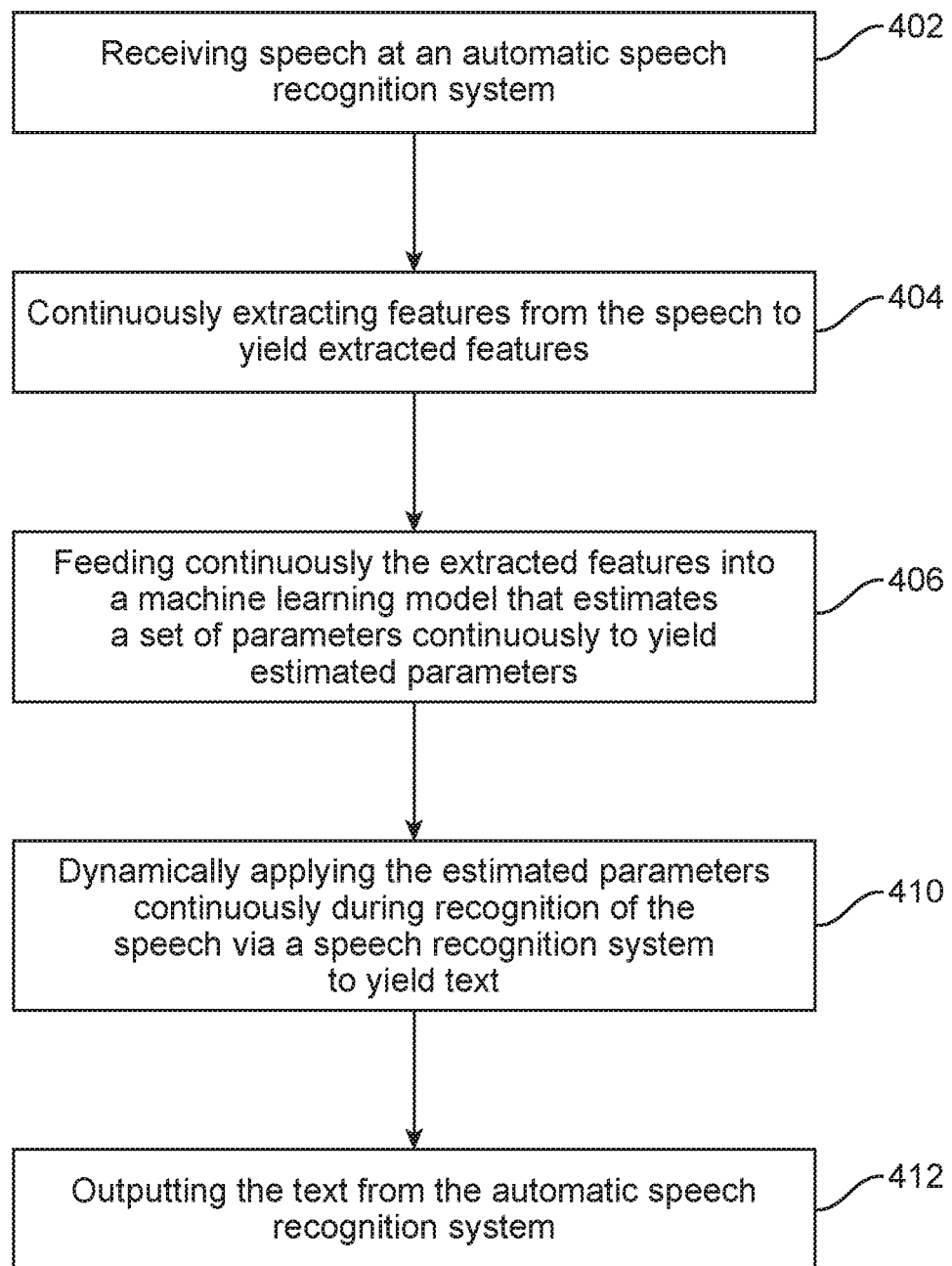
FIG. 4 illustrates an example embodiment for dynamic control of parameters.

FIG. 4 illustrates another method example embodiment related to the dynamic control of the parameters associated with automatic speech recognition. A method in this regard includes receiving speech at an automatic speech recognition system (402), continuously extracting features from the speech to yield extracted features (404), continuously feeding the extracted features into a machine learning model that continuously estimates a set of parameters to yield estimated parameters (406), dynamically applying the estimated parameters during recognition of the speech via a speech recognition system to yield text (410), and outputting the text from the automatic speech recognition system (412).

The continuous nature of the processing disclosed in FIG. 4 can be better understood with an example. The process of receiving speech at a speech recognition system is not an instantaneous event. For example, consider a system that receives speech that includes a long sentence "It was the best of times, it was the worst of times, it was the age of wisdom, it was the age of foolishness, it was the epoch of belief, it was the epoch of incredulity . . . " The process described above can include receiving the long sentence and beginning to extract features from the speech to yield the extracted features. Thus, features associated with the phrase "it was the best of times" (which can be represented by frame 1 in FIG. 2B) can be extracted and fed to a machine learning model that estimates the set of parameters. The system then receives the phrase "it was the worst of times" (Frame 2 in FIG. 2B) and extracts features from that phrase and feeds those features to the machine learning model to estimate or re-estimate the set of parameters. The machine learning model or hyper parameter estimator can produce updated hyper parameters for use by the automatic speech recognition modules for decoding the input speech. The estimator can also be trained on and utilize any type of metadata in order to further refine the estimated hyper parameters. The parameters extracted from Frame 1 by the model can be applied to the decoding of Frame 2 in one aspect or can be applied to the decoding of Frame 1 if the system is operating in real time, or if a delay is introduced in the decoding process.

A sliding window approach can be used for determining a portion of the input speech from which features can be extracted. The system may choose particular features to extract as well as a type of machine learning model to use for estimating the parameters which can provide a low latency impact such that improved speech recognition accuracy can occur in a scenario in which parameters are dynamically adjusted as speech is received, recognized and converted to text.

Figure 5:
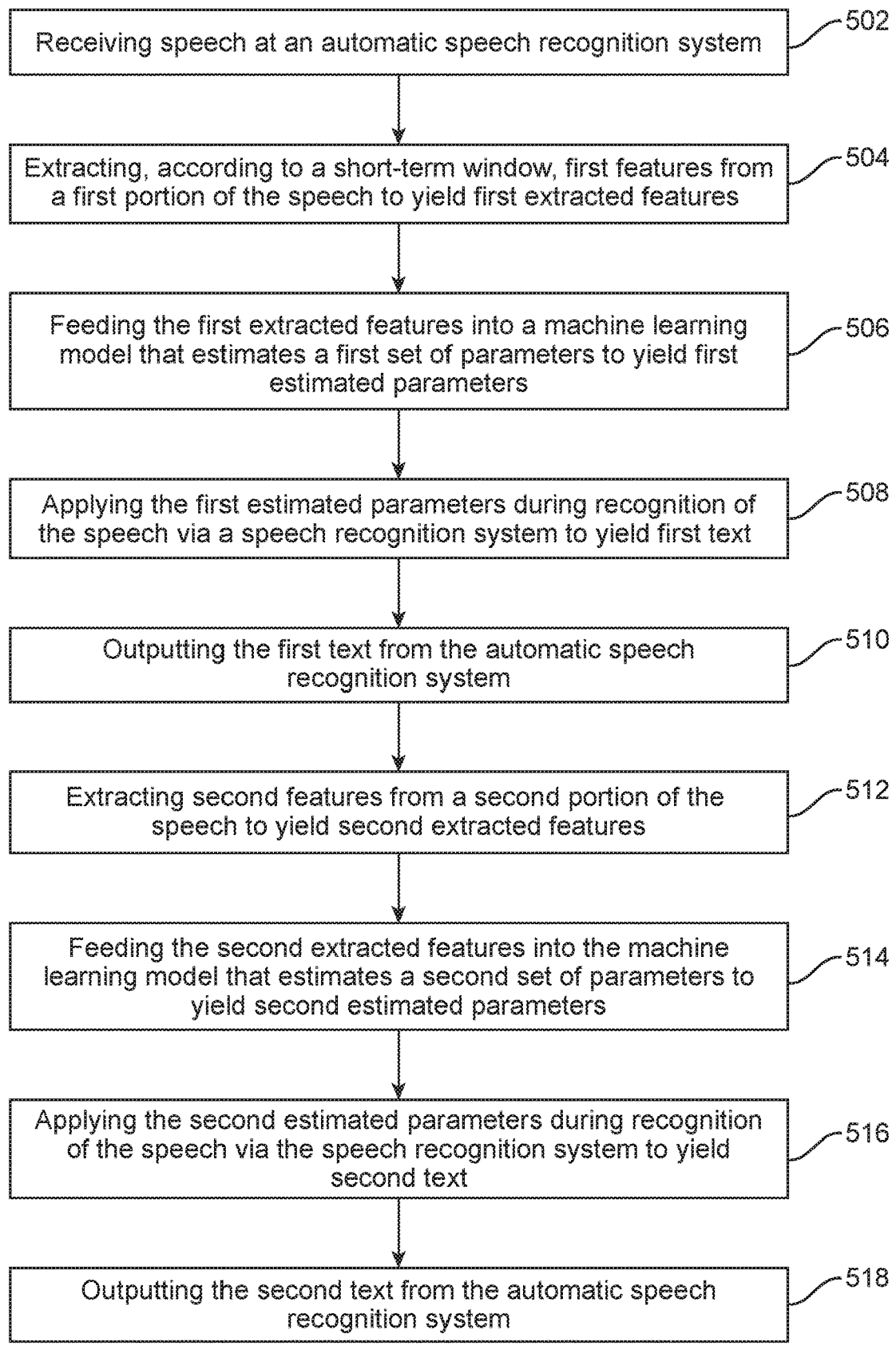
FIG. 5 illustrates an example method embodiment related to the dynamic control of parameters.

FIG. 5 illustrates another method example of the dynamic nature of processing speech while adjusting parameters that are utilized in decoding. A method includes receiving speech at an automatic speech recognition system (502), extracting, according to a short-term window, features first from a first portion of the speech to yield first extracted features (504), feeding the first extracted features into a machine learning model that estimates a first set of parameters to yield first estimated parameters (506), applying the first estimated parameters during recognition of the speech via a speech recognition system to yield first text (508) and outputting the first text from the automatic speech recognition system (510), then extracting second features from a second portion of the speech to yield second extracted features (512), feeding the second extracted features into the machine learning model that estimates a second set of parameters to yield second estimated parameters (514), applying the second estimated parameters during recognition of the speech via the speech recognition system to yield second text (516) and outputting the second text from the automatic speech recognition system (518). Utilizing metadata can also be part of the process of estimating various parameters using the machine learning model.

The approach disclosed in FIG. 5 can continuously be applied, such that a third portion of the speech is processed to yield third estimated parameters and ultimately third text, and so forth. This detailed description provides further understanding on how a continuous process can be implemented to dynamically fine-tune the parameters that are favorable for decoding. In the scenario where a user is speaking, if changes occur such as changes in background noise, changes in speech rates, changes in the user's voice, changes in metadata (such as the type of metadata that becomes available) or any other audible changes occur, such that the speech that is received could be categorized as "outlier" speech relative to the standard speech received and processed by the speech recognition system, then the parameters that are important or favorable to decoding can be dynamically adjusted for that outlier speech, which can thereby improve speech recognition accuracy over what could otherwise be achieved through a fixed configuration.

This disclosure also covers various options related to the estimation of hyper parameters and a direct or delayed application of those parameters in automatic speech recognition decoding. For example, the system can continuously update the hyper parameters while applying the parameters synchronously with automatic speech recognition decoding and its frameshift. For every 10 ms frame, the hyper parameters could be updated and the updated hyper parameters associated with a particular frame can be used for decoding that very frame, a neighboring frame, or a frame near the frame associated with the hyper parameters.

Estimation of hyper parameters and application of those parameters in automatic speech recognition decoding could also occur per utterance, per turn, per speech transaction, per time frame, per context, or on any other basis. For example, the system could estimate the hyper parameters on a certain amount of initial audio or speech frames such as after 1 s of audio or after 100 speech frames. The start of automatic speech recognition decoding could occur only once the estimation is done. For example, the system could delay automatic speech recognition by 1 s or 100 speech frames in order to receive the updated parameters for decoding each portion of speech. Any amount of time that would be appropriate for the delay is contemplated. Thus, a first one hundred speech frames can be fed into the hyper parameter estimator to yield one or more estimated hyper parameters. The automatic speech recognition decoder can delay the decoding of the first one hundred speech frames by is in order to allow time for the hyper parameter estimator to work. The one or more estimated hyper parameters can be fed to the automatic speech recognition decoder for use in actually decoding the first one hundred speech frames.

The system could also update the hyper parameters on a certain frequency, such as every second, and delay the application of the parameters in decoding by a certain window (not defined by time) or delay the decoding by a certain time window. The time frame may also be dynamic based on the type of speech, background noise, user preference, application of a predetermined condition, previous confidence in the successful application of the updated parameters, machine learning data, or artificial intelligence data or modeling, and so forth. For example, the system can evaluate whether the first ten windows of updated parameters likely improved automatic speech recognition decoding. The system may determine that a larger window of time or window of speech would be desirable in terms of improving the speech recognition results utilizing updated parameters. The system can, based on a threshold being met, switch to a delay frequency of every three seconds rather than every second based on this evaluation.

Another aspect of this disclosure relates to a batch processing approach to adjusting system parameters. The system could estimate the parameters per speech utterance. In this regard, the system could delay application of the estimated hyper parameters in decoding the respective next utterance or delay decoding until after the full utterance has been seen by the estimator. In one aspect, estimated hyper parameters estimated on one utterance are only applied to the decoding of the respective next utterance to the system.

The step of applying the set of parameters to processing the speech to yield text can be performed in a batch mode after a first decoding pass on the speech by the automatic speech recognition system without a modified set of parameters. In this regard, the step of applying the set of parameters to processing the speech to yield text can be performed in batch mode in either a later or delayed decoding pass by the automatic speech recognition system, or in a re-scoring attempt to recognize the speech by the automatic speech recognition system. The step can include estimating and applying the set of parameters as well.

Figure 6:
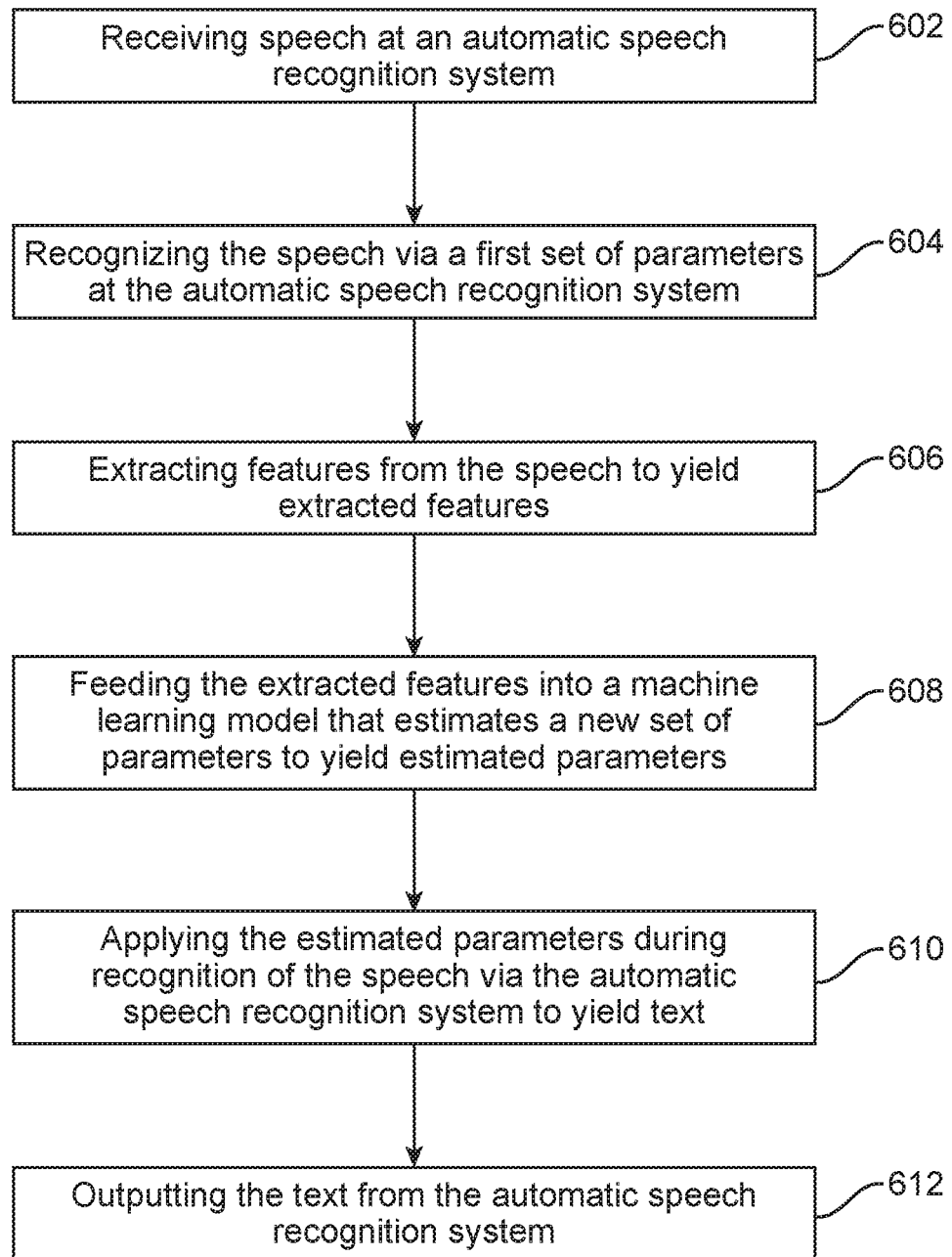
FIG. 6 illustrates an example embodiment for a batch mode application.

FIG. 6 illustrates a batch mode approach. A method includes receiving speech at an automatic speech recognition system (602), recognizing the speech via a first set of parameters at the automatic speech recognition system (604), extracting features from the speech to yield extracted features (606), feeding the extracted features into a machine learning model that estimates a new set of parameters to yield estimated parameters (608), applying the estimated parameters during recognition of the speech via the automatic speech recognition system to yield text (610) and outputting the text from the automatic speech recognition system (612). The extracted features can include speech or audio related features such as phonemes, prosody data, cadence data, volume data, and so forth. The extracted features may also include metadata which can be associated with the audio, but is not the audio itself. For example, the extracted features might include an estimate of the age of the speaker, a likely geographic location associated with the speaker, and so forth. Other metadata can also be utilized by the machine learning model, such as the user's gender, social media data, geographic location, and so forth. Any such metadata can be utilized by the machine learning model to estimate a new set of parameters.

The hyper parameter estimator can receive either audio data or metadata or both types of input as is shown in FIG. 2A. The received data is not exclusively one or the other. Because in batch mode the processing of the speech can occur later, the estimator may receive speech in one period of time and speech or metadata in another period of time, and perform separate estimates of parameters which can be combined or used separately to ultimately process or decode the speech.

In batch mode, or an off-line mode, audio can be received at the system, but not immediately processed, to generate text based on the audio. The audio that is received can have features extracted which can then be fed into the trained model. The trained model, as noted herein, can be a neural network, sequential model, or any other machine learning type model that estimates the set of parameters. A timing element is included as part of the batch mode scenario. Rather than striving to extract audio features for processing via the model that estimates the set of parameters in real time or dynamically at the same time as processing input, speech to generate text utilizing the estimated set of parameters in the batch mode, real time or dynamic processing, is not necessary. This scenario could be applied, for example, in the context of systems that perform automatic speech recognition on voicemail messages, or for processing speech from recorded videos, and so forth. Any offline transcription scenario could utilize a batch processing approach.

In the batch mode scenario, the speech can be received and stored for a period of time while audio features are extracted from the speech and processed by the trained model to estimate a new set of parameters. The new set of parameters can be subsequently used at a later or delayed time. For automatic speech recognition of the audio, an n-best list or lattice-rescoring function can be used. For example, an automatic speech recognition system might receive and process speech using an initial set of parameters for decoding, to generate an n-best list of possible recognition results. The system could also, in parallel, extract the audio features from the speech for processing by the trained model to estimate a new set of parameters. The system could then use the new set of parameters to modify the n-best list of possible recognition results. In this scenario, the result that originally was potentially listed as the third most probable recognition might be moved up in the n-best list to be the most probable result, based on application of the new set of parameters. Similarly, the original speech recognition process can yield a lattice scoring result which can then be re-scored according to the new set of parameters generated from the trained model.

The estimator model can run in parallel to a speech recognition system, or in a serial fashion, or a blend of these two with some continuous evaluation and feeding of estimated parameters with a real-time or delay in the speech recognition decoding processing based on whether updated parameters are available at any given moment.

Figure 7:
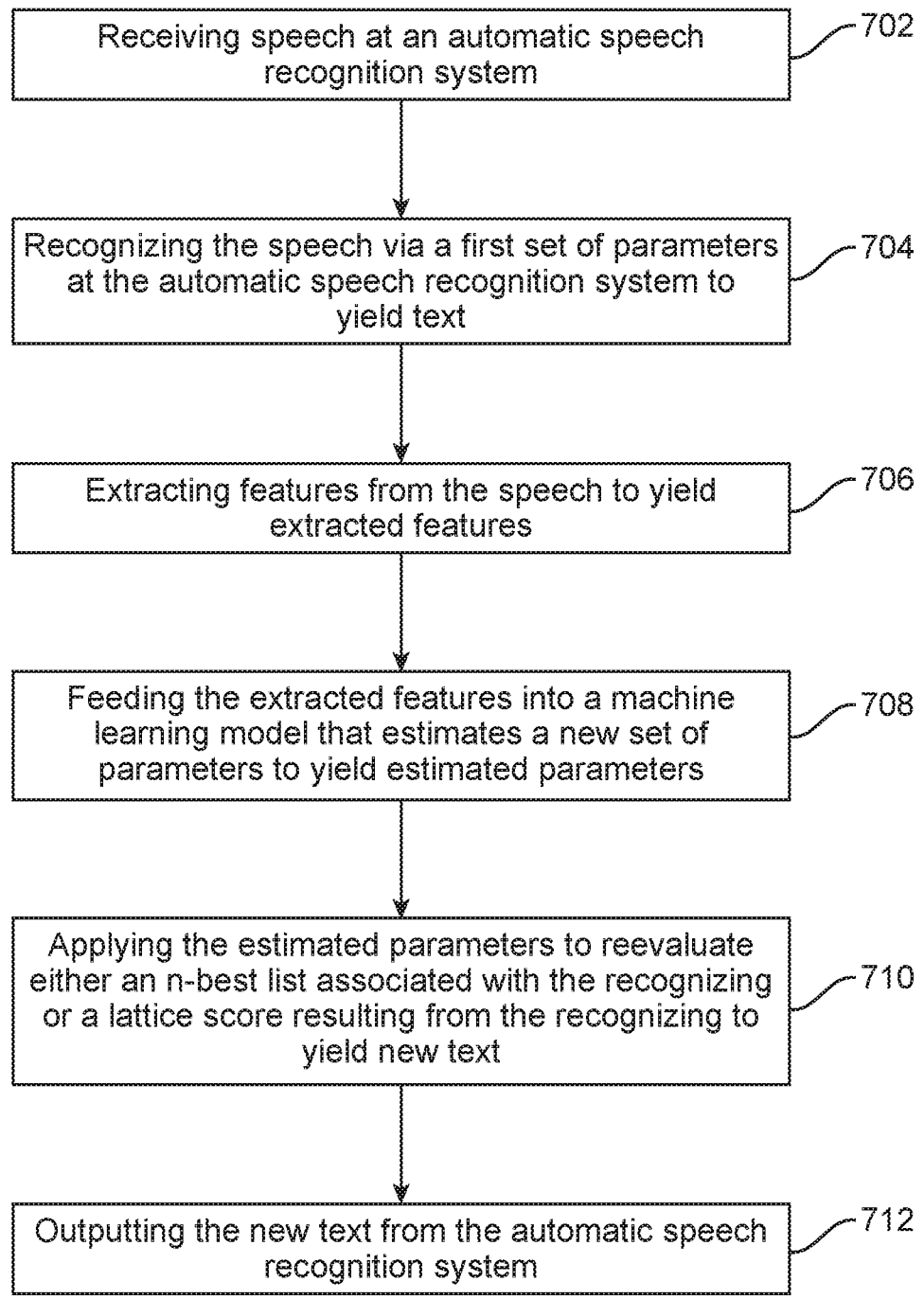
FIG. 7 illustrates another example method embodiment related to the batch mode application.

FIG. 7 illustrates another example of batch mode processing. The method includes receiving speech at an automatic speech recognition system (702), recognizing the speech via a first set of parameters at the automatic speech recognition system to yield text (704), extracting features from the speech to yield extracted features (706), feeding the extracted features into a machine learning model that estimates a new set of parameters to yield estimated parameters (708), applying the estimated parameters to reevaluate either an n-best list associated with the recognizing or a lattice score resulting from the recognizing to yield new text (710) and outputting the new text from the automatic speech recognition system (712). As noted above, metadata can also be provided to the machine learning model to estimate a new set of parameters. This metadata can be used in coordination with the extracted features to determine the estimated parameters or can be applied separately in order to refine the estimated parameters.

Estimating the set of parameters useful for performing automatic speech recognition can yield (1) the set of parameters directly as target layer outputs or (2) the set of parameters as a predefined parameter configuration chosen from a group of predefined parameter configurations. For example, a group of predefined parameter configurations can include a first set of parameters tailored for a noisy background, a second set of parameters configured for certain voice characteristics, a third set of parameters configured for a certain channel characteristic, a fourth set of parameters configured for a speaking rate, a fifth set of parameters for a particular car model, and so forth. In this scenario, the method would include receiving speech at a speech processing system and using a model trained on data to estimate the parameters that are favorable to processing the speech to yield an output from the model. The output from the model in this scenario could be one of a predefined set of parameters configured for certain audible characteristics. The model could be trained, for example, on ten different sets of parameters which can cover outlier audio scenarios. Thus, when the system experiences audible characteristics according to one of the outlier scenarios, the associated set of parameters that are predefined to make the appropriate adjustments to speech recognition processing for those audible characteristics can be implemented by the system and applied for processing that improve speech recognition accuracy.

Certain parameters, especially those that control a relative weight of applying a language model against an acoustic model and a duration model, as well as prior probability of speech versus non-speech and word insertion penalty, can allow the present principles to be applied in lattice rescoring or n-best list rescoring. In some application scenarios, where multiple correlated utterances from the same speaker, channel, acoustic environment and application scenarios are observed in succession, such as in the context of dictation applications, the approach can also allow application in successive online applications with the system parameters estimated in one utterance and can then applied in decoding the next utterance.

This approach could also be used independent of requirements such as utterances from the same speaker, channel, or acoustic environment. Because the estimated parameters for a particular utterance can have value in terms of the decoding of a next utterance after the particular utterance, the system can utilize those estimated parameters which are estimated from a first utterance, and apply those to automatic speech recognition decoding, to a second utterance. This approach typically takes into account the time that the estimator model takes to evaluate the speech and calculates or estimates the estimated parameters, which can be a parallel process to processing the same speech by the automatic speech recognition decoder. The words, or hyper parameters, are being estimated by the estimator model at the same time that the automatic speech recognition decoder is converting the text to speech for that phrase or that portion of the audio signal. By the time the estimated parameters are generated, in terms of timing, they are ready to be applied to the coding of the next portion of the speech by the automatic speech recognition decoder.

In one aspect, the estimated parameters will relate to features such as the speaker, the channel characteristics, environmental characteristics, and so forth. These parameters can be established at the beginning of an audio signal, and be dynamically set for decoding a second portion of an audio signal and be just as applicable to the second portion, the third portion, fourth portion, and so forth, as they would be for the first portion upon which the estimation of the hyper parameters was based.

Thus, in one example approach, the system can receive a stream of speech and evaluate the stream of speech through the hyper parameter estimator until a certain confidence level is met with respect to the estimated parameters that are desired. The timeframe or the window of time for evaluation might vary and be dynamic in this regard. The window might stay open until the hyper parameter estimator determines with a 90% confidence level (or whatever threshold is chosen) that the parameters are accurately estimated. That window of time might be 10 ms or 50 ms. Of course, the time frame can be fixed or dynamic as well. The hyper parameter estimator then provides those updated estimated parameters to the automatic speech recognition decoder for decoding the remainder of the speech. In one aspect, the hyper parameter estimator may stop estimating parameters for that speech from the same speaker, or may continue to provide estimates until a threshold improvement level with the estimated parameters is met, at which time the hyper parameter estimator may then update the first initial set of estimated parameters with the automatic speech recognition decoder. For example, if the hyper parameter estimator continues to evaluate the input speech and achieves a 98% confidence level in a second set of estimated parameters that differ at least in some respects with the first set of estimated parameters, then the system may replace the first set of estimated parameters with a second set of estimated parameters.

The system may repeat the process described above when the system determines there is a new speaker, a new location, new metadata or a new background experienced. For example, the same speaker may be providing audio to the system and may walk from a metro car into the outdoors, thus causing a change in the background noise configuration. The system could then initiate an update process in which the hyper parameter model will reevaluate the hyper parameters and provide a third estimated set of hyper parameters for the automatic speech recognition decoder to utilize. Thus, upon a certain threshold of change with respect to any aspect of the audio signal, the system can provide another updated set of parameters to the decoder.

This disclosure notes, as was mentioned in the above discussion, that it is preferable that the system operate more on a continuous basis in which the hyper parameter estimator continuously evaluates windows of audio and outputs and produces estimated parameters.

In the correlated scenario, the system could generate a first set of parameters that relate to a session in which speech is received from a user, and features from the speech are processed by the trained model to generate the output, which is used for modifying or adjusting parameters in speech recognition. The first set of parameters can be stored as a predetermined configuration or set of parameters that can then be retrieved at a later or delayed time when certain conditions are met. For example, the system can identify different patterns which can cause later speech processing to be correlated to the session. Data that can be utilized to determine correlations can include one or more of the same speaker, a new speaker as part of a defined group, a same time of day, similar content in dictation subject matter, similar cadence in speech characteristics, similar process as the same document that is retrieved for dictation, a same folder for a new second document that is used for a first document as part of a first session, and so forth. Users may also manually identify that a new dictation is related to an earlier dictation, and is thus correlated, which causes the system to utilize previously generated parameters for speech processing which will adjust fixed or preset parameters associated with the speech processing. Any one or more of these factors can be implemented to retrieve an estimated set of parameters at a later time for application to a correlated speech processing session.

Processes associated with training the learned model or estimator 204 are described next. Various options are disclosed herein. There are at least two alternatives. Training data labels can be tuned towards the training objective on data clusters. In another aspect, developers can tune towards the training objective on individual utterances. Both allow iterative top-down and bottom-up refinement.

Figure 8:
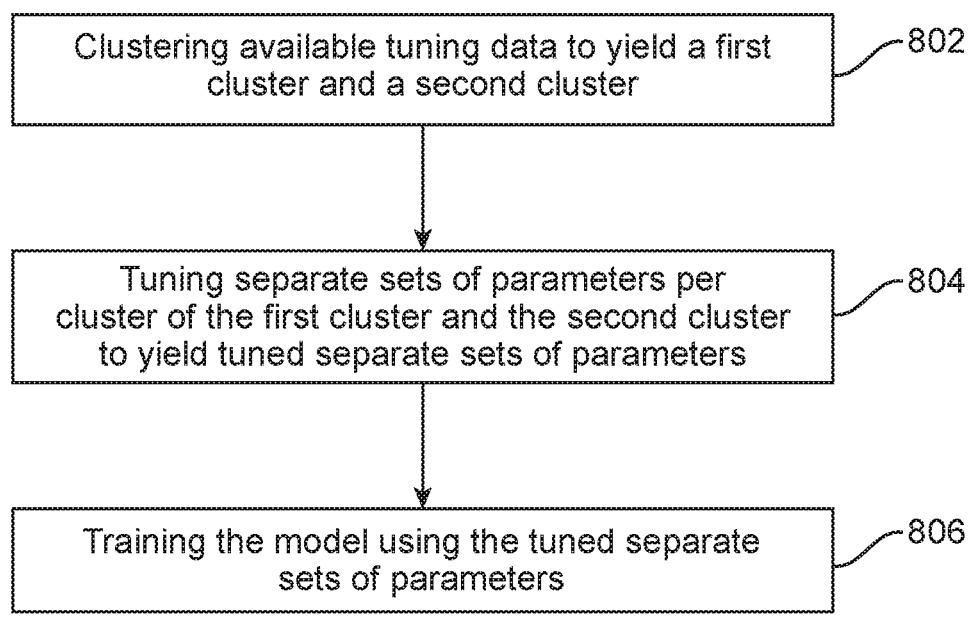
FIG. 8 illustrates an example method embodiment for training an estimator.

FIG. 8 illustrates a method example of training the model or the estimator using data clusters. The method includes clustering available tuning data to yield a first cluster and a second cluster (802), tuning separate sets of parameters per cluster of the first cluster and the second cluster to yield tuned separate sets of parameters (804), and training the model using the tuned separate sets of parameters (806).

With respect to the iterative, top-down approach, this disclosure proposes, as seen in FIG. 8, clustering available tuning data, tuning separate sets of parameters per cluster and using those as training targets for the neural network or model. To cluster the data into subsets which allow for accuracy success from different sets of parameters, different criteria can be considered. For example, the following data could be considered as part of the training data: Metadata tags (e.g. data source, customer, application, microphone type, vehicle type, collection vs. field, time of day, weather conditions at a location, and so forth), signal-to-noise ratio, a number of deletions and a number of insertions on token, phonetic or character/Hanzi level, length of utterances (in terms of the number of words, or the number of phonemes, or other factor), automatic speech recognition lattice derived penalty, scale parameters and other audio-based features (e.g. average MFCC, absolute value of the signal energy . . . ).

Unsupervised algorithms can be applied (such as k-means) to group the data into clusters along those lines. Here, one can consider iterative re-clustering of the utterances along best performance (best accuracy at lowest compute cost) with the established parameters sets in order to iteratively establish sharper clusters.

With respect to a bottom-up approach for refinement, for certain parameters, especially those that control the relative weight of language model against acoustic model against duration model as well as prior probability of speech vs. non-speech and word insertion penalty, training targets can also be derived separately per utterance via adjusting those parameters towards minimum word error rate (WER), or other error measure, on the automatic speech recognition lattice or the n-best output. Training targets and configuration for estimated parameters is not a trivial aspect.

The utterance specific weight and bias parameters can again be guidance for the utterance clustering for separate tuning as described above.

Tuning of the (heuristic) search space pruning (e.g., pruning beam width) cannot be derived from the automatic speech recognition output lattice. However, it can be conducted in grid search-like approaches. In order to limit compute cost, a broad grid is advisable.

The particular novelty of the disclosed concepts lies in the data-based adjustment of system parameters like those that determine the relative weights of involved models as well as those that control the decoding to fit into compute constraints at best possible automatic speech recognition accuracy. These parameters are usually considered intractable to model-based learning, but need to be tried out or set via grid-search on development data. The present disclosure has the potential to yield automatic speech recognition accuracy improvements in various types of automatic speech recognition offerings. It has the potential to particularly improve automatic speech recognition for outlier conditions, channels and speakers, which is often regarded particularly desirable for successful product deployments.

In first experiments around Mandarin cloud ASR for Automotive domain, the inventors have seen up to 20% character error rate reductions (CERR) with test set specific parameter sets and about perfect test set condition estimation with audio-based classifiers. In these first experiments, inventors looked at Chinese Mandarin automatic speech recognition for an automotive context. The same acoustic model and language model are used for both baseline and proposed approach.

The baseline uses a single operating point optimized over all domains and test conditions for an overall best performance. Along the proposed approach, a classifier was trained to predict the best operating point for each utterance, out of a pre-defined pool. Each pre-defined operating point was optimized for a single condition specifically. In total, 13 conditions are evaluated, leading to 13 operating points pre-defined in the pool.

TABLE 1

| CER | testset/ condition | baseline | operating point via classifier | CERR |
| --- | --- | --- | --- | --- |
| Collection data | A | 10.36% | 10.00% | 3.47% |
|  | B | 4.69% | 4.66% | 0.64% |
|  | C | 1.14% | 1.02% | 10.53% |
|  | D | 1.09% | 1.05% | 3.67% |
|  | E | 11.14% | 8.35% | 25.04% |
|  | F | 5.40% | 5.24% | 2.96% |
| Customer data | A | 16.85% | 15.88% | 5.76% |
|  | B | 11.39% | 11.53% | −1.23% |
|  | C | 20.86% | 14.93% | 28.43% |
|  | D | 13.81% | 13.29% | 3.77% |
|  | E | 7.40% | 6.67% | 9.86% |
|  | F | 12.15% | 11.75% | 3.29% |
|  | G | 7.59% | 7.49% | 1.32% |

Table 1 shows character error rates (CERs) and relative character error rate reductions (CERR) for all conditions. Note that training the classifier and optimizing the pre-defined operating points used the same data sources and conditions as in test, but no overlap as to the exact test data. Collection data can be data, for example, such as accent data whether an accent is heavy or light, or noise related to a car driving or in park. Customer data can include data such as vehicle related data, animal data, voice data, and so forth.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any data processing system that utilizes parameters for evaluating data input to generate output. While typical ASR magic tuning parameters are the example mainly discussed above, the disclosure covers other concepts as well, especially those that the future ASR technique might develop. The disclosure also covers any audio labelling task like natural language understanding (directly) on audio. In another aspect, the disclosure extends beyond automatic speech recognition and audio labeling to any other machine learning task which requires tuning system parameters on development sets. In this regards, automatic speech recognition would just be an example task.

Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving first speech at an automatic speech recognition system;
estimating, from the first speech via a model trained on metadata to output parameters associated with a chosen acoustic environment, a first set of parameters associated with the chosen acoustic environment;
receiving second speech at the automatic speech recognition system;
extracting features from the second speech;
refining the estimated first set of parameters based on the extracted features from the second speech;
applying, by the automatic speech recognition system, the refined estimated first set of parameters to recognize the first speech and the second speech to yield text; and
outputting the text from the automatic speech recognition system.

2. The method of claim 1, wherein the chosen acoustic environment is selected from a plurality of different acoustic environments.

3. The method of claim 1, wherein the first set of parameters comprises one or more of a word insertion penalty, a silence prior, a word penalty, a beam pruning width, a language model scale, an acoustic model scale, a duration model scale, other search pruning control parameters, and a language model interpolation vector.

4. The method of claim 1, further comprising, prior to estimating the first set of parameters, applying initial parameters for recognizing initial speech received at the automatic speech recognition system, wherein the first set of parameters replace the initial parameters.

5. The method of claim 1, wherein the model utilizes one or more of a signal-to-noise ratio estimate, reverberation time estimate, a short-term window frequency analysis, a mel-scale frequency cepstral analysis, time-domain signal audio signal directly and the metadata to estimate the first set of parameters.

6. The method of claim 1, wherein the metadata includes non-audio data.

7. The method of claim 1, wherein the model is separate from the automatic speech recognition system and comprises one of a feedforward neural network, unidirectional or bidirectional recurrent neural network, a convolutional neural network or a support vector machine model.

8. The method of claim 1, wherein the metadata is incorporated into the model via one-hot encoding or embedding.

9. The method of claim 1, wherein estimating the first set of parameters and applying the refined estimated first set of parameters to recognize the first speech and the second speech to yield the text is performed in a batch mode.

10. The method of claim 9, wherein the applying of the refined estimated first set of parameters to recognize the first speech and the second speech to yield the text is performed in either a delayed decoding pass by the automatic speech recognition system, or in a rescoring that rescores result options from a first speech recognition pass given estimated hyper parameters.

11. The method of claim 10, wherein the estimated hyper parameters estimated on one utterance are only applied in decoding of a respectively next utterance.

12. The method of claim 1, wherein estimating the first set of parameters useful for performing automatic speech recognition yields (1) the first set of parameters directly as target layer outputs or (2) the first set of parameters as a predefined parameter configuration chosen from a group of predefined parameter configurations.

13. An automatic speech recognition system comprising:
 a processor; and
 a non-transitory computer-readable storage medium having instructions stored which, when executed by the processor, cause the processor to perform operations comprising:
  estimating, via a model, a first set of parameters associated with a chosen acoustic environment, the first set of parameters being useful for performing automatic speech recognition, wherein the estimating is performed during speech recognition of first speech received by the automatic speech recognition system;
  generating a list of recognition results using the first set of parameters;
  receiving second speech at the automatic speech recognition system;
  estimating, via the model, a second set of parameters based on processing the second speech; and
  applying, by the automatic speech recognition system, the second set of parameters to rescore the list of recognition results.

14. The automatic speech recognition system of claim 13, wherein the chosen acoustic environment is selected from a plurality of different acoustic environments.

15. The automatic speech recognition system of claim 13, wherein the first set of parameters comprises one or more of a word insertion penalty, a silence prior, a word penalty, a beam pruning width, a language model scale, an acoustic model scale, a duration model scale, other search pruning control parameters, or a language model interpolation vector.

16. The automatic speech recognition system of claim 13, wherein the non-transitory computer-readable storage medium stores further instructions which, when executed by the processor, cause the processor to perform further operations comprising:
 prior to estimating the first set of parameters, applying initial parameters for recognizing initial speech received at the automatic speech recognition system, wherein the first set of parameters replace the initial parameters.

17. The automatic speech recognition system of claim 13, wherein the model utilizes one or more of a signal-to-noise ratio estimate, reverberation time estimate, a short-term window frequency analysis, a mel-scale frequency cepstral analysis, time-domain signal audio signal directly and the metadata to estimate the first set of parameters.

18. The automatic speech recognition system of claim 13, wherein the model is trained on metadata to output the first set of parameters, wherein the metadata comprises non-audio data.

19. The automatic speech recognition system of claim 13, wherein estimating the first set of parameters useful for performing automatic speech recognition yields (1) the first set of parameters directly as target layer outputs or (2) the first set of parameters as a predefined parameter configuration chosen from a group of predefined parameter configurations.

20. A method comprising:
 receiving speech at an automatic speech recognition system;
 extracting first features from a first portion of the speech;
 inputting the extracted first features into a machine learning model that estimates a first set of parameters useful for performing automatic speech recognition by the automatic speech recognition system;
 applying the first set of parameters to the automatic speech recognition system to yield a tuned automatic speech recognition system;
 extracting second features from a second portion of the speech;
 inputting the extracted second features into the machine learning model that refines the estimated first set of parameters;
 recognizing, by applying the refined estimated first set of parameters, the first portion of speech and the second portion of speech by the tuned automatic speech recognition system to yield text; and
 outputting the text from the tuned automatic speech recognition system.

* * * * *